(12) United States Patent
Ogasawara et al.

(10) Patent No.: US 9,942,953 B2
(45) Date of Patent: Apr. 10, 2018

(54) POWER SUPPLY DEVICE SERVING AS DC POWER SUPPLY, AND LIGHTING FIXTURE

(71) Applicant: Panasonic Intellectual Property Management Co., Ltd., Osaka (JP)

(72) Inventors: Kiyoshi Ogasawara, Osaka (JP); Takafumi Fujino, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/190,808

(22) Filed: Jun. 23, 2016

(65) Prior Publication Data

US 2017/0013683 A1 Jan. 12, 2017

(30) Foreign Application Priority Data

Jul. 7, 2015 (JP) .................................. 2015-136530
Aug. 31, 2015 (JP) .................................. 2015-170736

(51) Int. Cl.
*H05B 33/08* (2006.01)
*H02M 7/217* (2006.01)
*H02M 1/42* (2007.01)

(52) U.S. Cl.
CPC ...... *H05B 33/0815* (2013.01); *H02M 1/4225* (2013.01); *H05B 33/0809* (2013.01); *H05B 33/0851* (2013.01); *Y02B 70/126* (2013.01)

(58) Field of Classification Search
CPC ........... H05B 33/0815; H05B 33/0845; H02M 1/4225
See application file for complete search history.

(56) References Cited

U.S. PATENT DOCUMENTS

| 5,583,421 | A | 12/1996 | Barbehenn et al. | |
|---|---|---|---|---|
| 2003/0209993 | A1* | 11/2003 | Ito | H05B 41/2886 315/209 R |
| 2004/0080273 | A1* | 4/2004 | Ito | H05B 33/0815 315/77 |
| 2012/0182769 | A1* | 7/2012 | Yonezawa | H02M 1/34 363/21.12 |
| 2013/0301308 | A1* | 11/2013 | Hosotani | H02M 3/3381 363/21.03 |
| 2014/0028187 | A1* | 1/2014 | Kambara | H02M 3/33507 315/77 |

(Continued)

FOREIGN PATENT DOCUMENTS

| JP | 08-66017 A | 3/1996 |
|---|---|---|
| JP | 08-130869 A | 5/1996 |

(Continued)

*Primary Examiner* — Tung X Le
*Assistant Examiner* — Raymond R Chai
(74) *Attorney, Agent, or Firm* — Renner Otto Boisselle & Sklar, LLP

(57) ABSTRACT

The power supply device includes a converter including a pair of input terminals, a pair of output terminals, a transformer, a capacitor, and a switching device, and a controller for controlling the switching device. The capacitor is electrically connected between the pair of input terminals. The converter further includes a reverse flow preventer for preventing a current from flowing through a closed circuit including the capacitor, a primary winding of the transformer, and the switching device, in an opposite direction to a direction of a discharging current from the capacitor.

15 Claims, 14 Drawing Sheets

(56) References Cited

U.S. PATENT DOCUMENTS

| | | | | |
|---|---|---|---|---|
| 2014/0117865 A1* | 5/2014 | Deng | ............... | H02M 1/4225 315/200 R |
| 2015/0069925 A1* | 3/2015 | Van Der Veen | ... | H05B 33/0806 315/206 |
| 2015/0123565 A1* | 5/2015 | Hu | ............... | H05B 33/0815 315/294 |
| 2015/0222178 A1* | 8/2015 | Skinner | ............... | H02M 1/4225 363/126 |

FOREIGN PATENT DOCUMENTS

| | | | |
|---|---|---|---|
| JP | 2004-266928 | A | 9/2004 |
| JP | 2004-536434 | A | 12/2004 |
| JP | 2007-189004 | A | 7/2007 |
| JP | 2012-014965 | A | 1/2012 |
| JP | 2012-084489 | A | 4/2012 |
| WO | WO 03/009654 | A1 | 1/2003 |

* cited by examiner

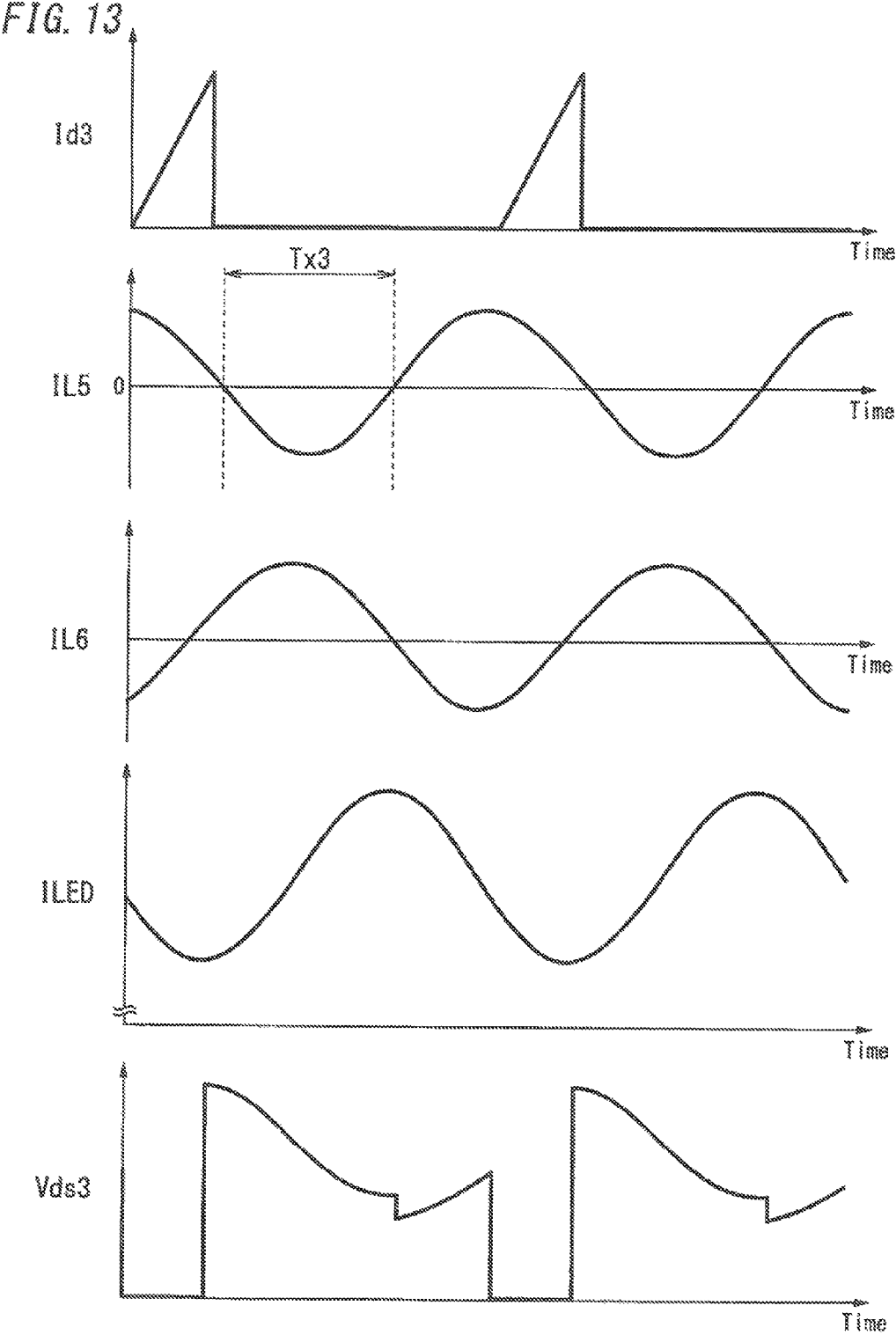

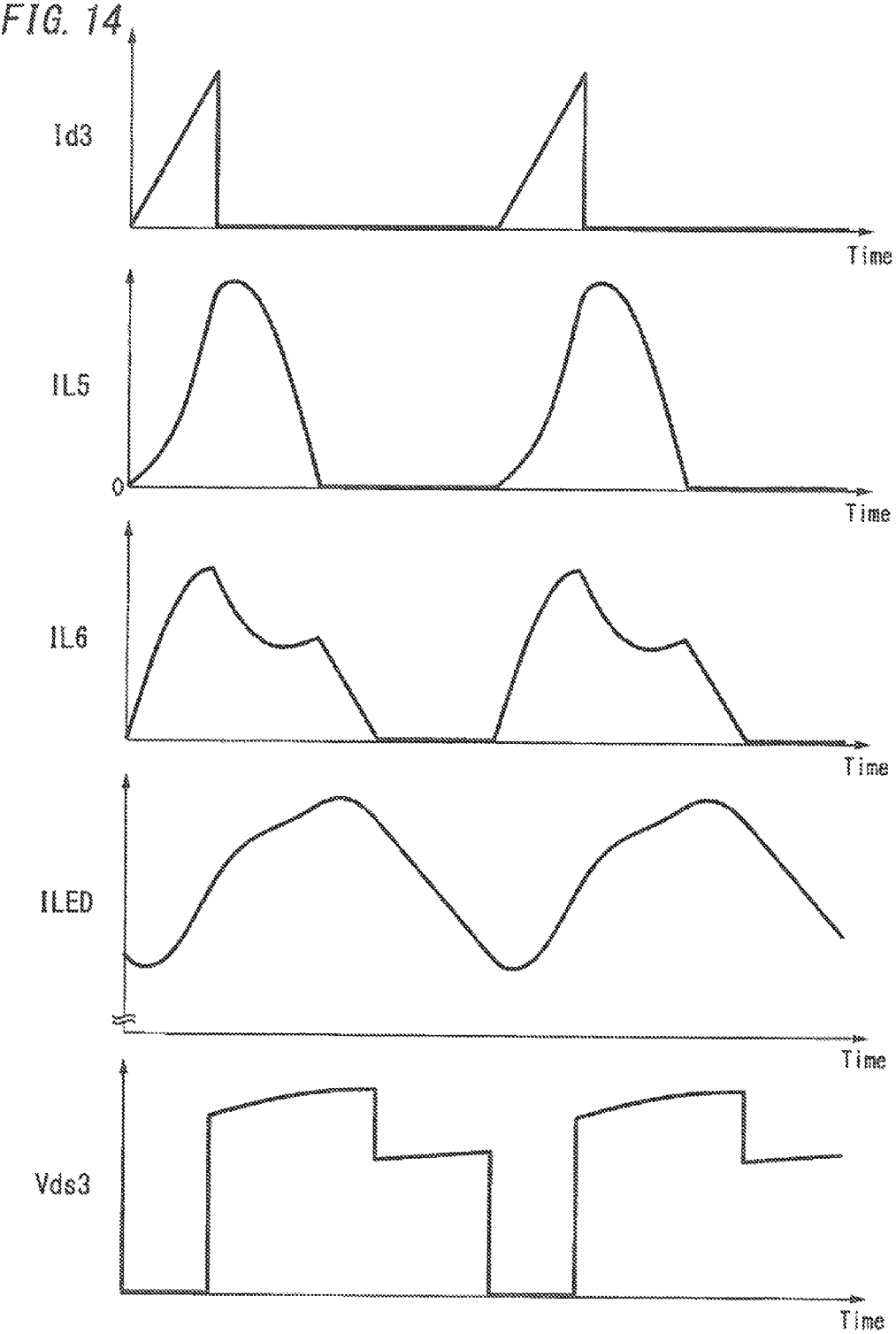

ically coupled, a capacitor, and a switching device; and a controller configured to control the switching device. The capacitor is electrically connected between the pair of input terminals. The capacitor, the primary winding, and the switching device are connected in series in a closed circuit. The converter is configured to, when the switching device is switched to an on-state, store energy inputted through the pair of input terminals in the primary winding and the secondary winding, and, when the switching device is switched to an off-state, produce a DC output voltage between the pair of output terminals by use of energy stored in the primary winding and the secondary winding. The converter further includes a reverse flow preventer for preventing, when the switching device is switched to the off-state, a current from flowing through the closed circuit in an opposite direction to a direction of a discharging current from the capacitor.

POWER SUPPLY DEVICE SERVING AS DC POWER SUPPLY, AND LIGHTING FIXTURE

CROSS-REFERENCE TO RELATED APPLICATIONS

The application is based upon and claims the benefit of priorities of Japanese Patent Application No. 2015-136530, filed on Jul. 7, 2015, and Japanese Patent Application No. 2015-170736, filed on Aug. 31, 2015, the entire contents of which are incorporated herein by reference.

TECHNICAL FIELD

The present disclosure generally relates to power supply devices and lighting fixtures including the power supply devices, and particularly relates to a power supply device serving as a DC power supply device and a lighting fixture including the power supply device.

BACKGROUND ART

In the past, there has been proposed a switching apparatus for operating light emitting diodes (LEDs) (e.g., Document 1 [JP 2004-536434 A]).

The switching apparatus of Document 1 includes a single ended primary inductance converter (SEPIC).

For power supply devices such as the switching apparatus disclosed in Document 1, there is a demand that the power supply device is downsized but nevertheless a decrease in an efficiency of power transfer is suppressed.

SUMMARY

An objective of the present disclosure is to propose a power supply device capable of being downsized while suppressing a decrease in an efficiency of power transfer, and a lighting fixture including the power supply device.

The power supply device of one aspect of the present disclosure includes: a converter including a pair of input terminals, a pair of output terminals, a transformer including a primary winding and a secondary winding which are magnetically coupled, a capacitor, and a switching device; and a controller configured to control the switching device. The capacitor is electrically connected between the pair of input terminals. The capacitor, the primary winding, and the switching device are connected in series in a closed circuit. The converter is configured to, when the switching device is switched to an on-state, store energy inputted through the pair of input terminals in the primary winding and the secondary winding, and, when the switching device is switched to an off-state, produce a DC output voltage between the pair of output terminals by use of energy stored in the primary winding and the secondary winding. The converter further includes a reverse flow preventer for preventing, when the switching device is switched to the off-state, a current from flowing through the closed circuit in an opposite direction to a direction of a discharging current from the capacitor.

The lighting fixture of one aspect of the present disclosure includes a light source unit and the power supply device for operating the light source unit.

BRIEF DESCRIPTION OF THE DRAWINGS

FIG. 13 is a timing chart of an operation of the power supply device of Comparative Example 3.

FIG. 14 is a timing chart of an operation of the power supply device of Embodiment 3.

The figures depict one or more implementation in accordance with the present teaching, by way of example only, not by way of limitations. In the figures, like reference numerals refer to the same or similar elements.

DETAILED DESCRIPTION

Embodiment 1

Figure 1:
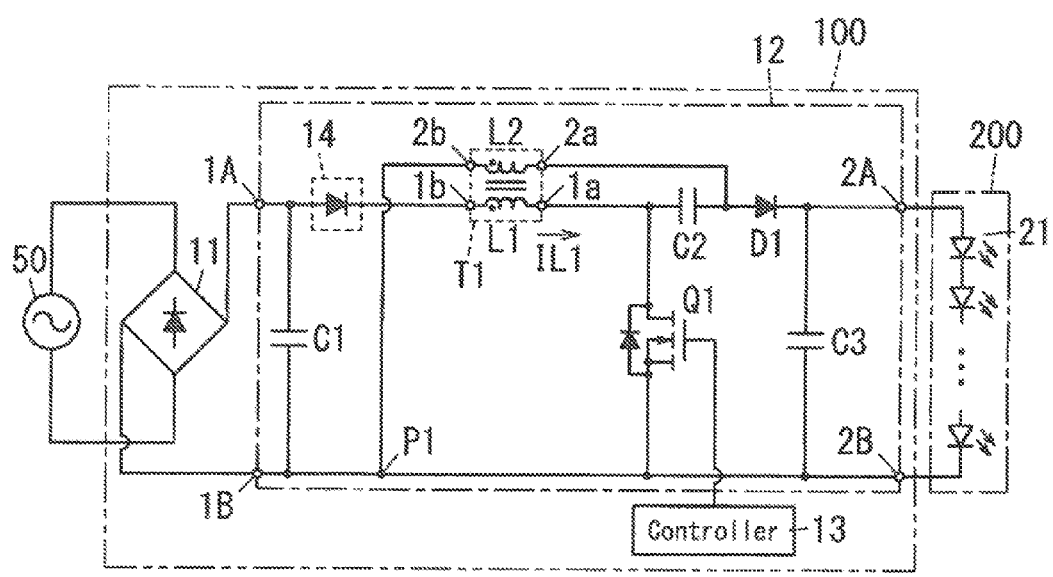
FIG. 1 is a circuit diagram of the lighting fixture including the power supply device of Embodiment 1.

The following description referring to FIG. 1 is made to a power supply device 100 of the present embodiment.

The power supply device 100 is configured to operate (turn on) a light source unit 200. In more detail, the power supply device 100 is configured to operate the light source unit 200 by use of power from an AC power supply 50.

The light source unit 200 includes multiple solid light emitting devices 21. Each of the multiple solid light emitting devices 21 is a light emitting diode (LED). In summary, the light source unit 200 is a light source configured to operate with DC power. The multiple solid light emitting devices 21 are electrically connected in series. Each of the multiple solid light emitting devices 21 has a light emitting color of white.

The power supply device 100 is configured to generate DC power from power supplied from the AC power supply 50 and then supply the DC power to the light source unit 200. The power supply device 100 includes a diode bridge 11, a converter 12, and a controller 13.

The diode bridge 11 includes a pair of input terminals and a pair of output terminals, and is configured to cause a pulsating voltage between the pair of output terminals based on an AC voltage applied between the pair of input terminals. The pair of input terminals of the diode bridge 11 is electrically connected to the AC power supply 50. The AC power supply 50 may output an AC voltage in a predetermined range (e.g., a range of 90 to 270 V), for example. In other words, the AC voltage in the predetermined range is to be applied between the pair of input terminals of the diode bridge 11. The pair of output terminals of the diode bridge 11 is electrically connected to the converter 12.

The converter 12 is a converter based on a single-ended primary-inductor converter (SEPIC) topology. The converter 12 includes a transformer T1. The transformer T1 includes a primary winding L1 and a secondary winding L2. Further, the converter 12 includes a pair of input terminals 1A and 1B and a pair of output terminals 2A and 2B. The pair of input terminals 1A and 1B include a first input terminal 1A serving as a high potential side terminal, and a second input terminal 1B serving as a low potential side terminal. The pair of output terminals 2A and 2B include a first output terminal 2A serving as a high potential side terminal, and a second output terminal 2B serving as a low potential side terminal.

Additionally, the converter 12 includes a series circuit of a capacitor (input capacitor) C1, the primary winding (hereinafter, referred to as "first inductor") L1, and a switching device Q1. Moreover, the converter 12 includes a series circuit of a capacitor C2 and the secondary winding (hereinafter, referred to as "second inductor") L2, and a series circuit of a diode (output diode) D1 and a capacitor (output capacitor) C3.

The series circuit of the capacitor C1, the first inductor L1, and the switching device Q1 forms a closed circuit including the capacitor C1, the first inductor L1, and the switching device Q1. In other words, the capacitor C1, the first inductor L1, and the switching device Q1 are connected in series in the closed circuit including the capacitor C1, the first inductor L1, and the switching device Q1.

The pair of input terminals 1A and 1B are electrically connected to the pair of output terminals of the diode bridge 11. In summary, the pulsating voltage from the diode bridge 11 is to be applied between the pair of input terminals 1A and 1B.

The capacitor C1 is electrically connected between the pair of input terminals 1A and 1B. The capacitor C3 is electrically connected between the pair of output terminals 2A and 2B. Further, the light source unit 200 is electrically connected between the pair of output terminals 2A and 2B.

The capacitor C2 serves as a coupling capacitor electrically isolating the pair of input terminals 1A and 1B from the pair of output terminals 2A and 2B with regard to a DC current. The capacitor C2 has a primary terminal (input side terminal) electrically connected to the first inductor L1 (directly or indirectly connected to the first inductor L1). The capacitor C2 has a secondary terminal (output side terminal) electrically connected to the second inductor L2 (directly or indirectly connected to the second inductor L2). In summary, the capacitor C2 is connected between a first end 1a of the first inductor L1 and a first end 2a of the second inductor L2.

The converter 12 is configured to convert a voltage across the capacitor C1 into a DC output voltage according to an operation (switching operation) of the switching device Q1 and then output the DC output voltage via the pair of output terminals 2A and 2B. In more detail, the converter 12 is configured to, when the switching device Q1 is switched to an on-state, store energy inputted through the pair of input terminals 1A and 1B in the primary winding L1 and the secondary winding L2, and, when the switching device Q1 is switched to an off-state, produce a DC output voltage between the pair of output terminals 2A and 2B by use of energy stored in the primary winding L1 and the secondary winding L2.

The switching device Q1 is an enhancement n-channel metal oxide semiconductor field effect transistor (MOSFET). Note that, in FIG. 1, a graphic symbol of the switching device Q1 shows a diode representing a parasitic diode.

The switching device Q1 has a drain terminal electrically connected to the first end 1a of the first inductor L1. The first inductor L1 has a second end 1b electrically connected to the high potential side terminal of the capacitor C1.

The converter 12 further includes a reverse flow preventer 14. The reverse flow preventer 14 is provided between the second end 1b of the first inductor L1 and the high potential side terminal of the capacitor C1.

The switching device Q1 has a gate terminal electrically connected to the controller 13. The switching device Q1 has a source terminal electrically connected to a low potential side terminal of the capacitor C1.

The drain terminal of the switching device Q1 is electrically connected to the primary terminal of the capacitor C2. The secondary terminal of the capacitor C2 is electrically connected to the first end 2a of the second inductor L2. The second inductor L2 has a second end 2b electrically connected to the low potential side terminal of the capacitor C1. Further, the second end 2b of the second inductor L2 is electrically connected to the source terminal of the switching device Q1.

Further, the secondary terminal of the capacitor C2 is electrically connected to an anode of the diode D1. The diode D1 has a cathode electrically connected to a high potential side terminal of the capacitor C3. The capacitor C3 has a low potential side terminal electrically connected to the source terminal of the switching device Q1.

In the power supply device 100, the first inductor L1 and the second inductor L2 are transformer-coupled (strongly coupled), and a coupling coefficient of the first inductor L1 and the second inductor L2 may be 0.98, for example.

Each of the capacitor C1 and the capacitor C2 has an electrostatic capacitance set to be equal to or smaller than 100 nF so that the converter 12 offers a large power factor (e.g., equal to or greater than 0.95). Note that, the capacitor C1 and the capacitor C2 may have the same electrostatic capacitance or different electrostatic capacitances.

The controller 13 is configured to control the converter 12. In more detail, the controller 13 is configured to control the switching device Q1 by use of control signals. The control signals may be pulse width modulation (PWM) signals.

The controller 13 may include one or more microprocessors, for example. The one or more microprocessors may include one or more memories. The one or more memories store one or more programs. The one or more programs are for allowing the one or more processors to function as the controller 13. The one or more programs may define one or more operation modes for operating the power supply device 100, for example. Note that, the one or more programs may be stored in the one or more memories of the one or more microprocessors. However, the one or more programs may be provided through one or more recording media such as memory cards or telecommunication circuits.

The controller 13 is configured to cause an operation (switching operation) of the switching device Q1 in a discontinuous mode. In other words, the controller 13 is configured to control the switching device Q1 so that the converter 12 operates in the discontinuous mode. In more detail, the controller 13 is configured to operate the switching device Q1 in the discontinuous mode, irrespective of application of an AC voltage in the predetermined range between the pair of input terminals of the diode bridge 11. Thereby, in the power supply device 100, the controller 13 turns on the switching device Q1 after a current flowing through the diode D1 becomes zero. Therefore, it is possible to suppress occurrence of a recovery current in the diode D1. In other words, the power supply device 100 can suppress occurrence of a loss (recovery loss) due to the diode D1. In summary, the power supply device 100 allows soft switching of the diode D1. Note that, the discontinuous mode means an operation mode of operating the switching device Q1 so that a current IL1 flowing through the first inductor L1 becomes zero during a certain time period.

The reverse flow preventer 14 prevents a current from flowing through the closed circuit including the capacitor C1, the first inductor L1, and the switching device Q1 in an opposite direction to a direction of the discharging current from the capacitor C1. In more detail, the reverse flow preventer 14 prevents, when the switching device Q1 is switched to the off-state, a current from flowing through the closed circuit in an opposite direction to a direction of a discharging current from the capacitor C1.

The reverse flow preventer 14 may include a diode, for example. The reverse flow preventer 14 is electrically connected in series with the first inductor L1 and the switching device Q1 between opposite ends of the capacitor C1 so as to allow the discharging current from the capacitor C1 to flow through the reverse flow preventer 14. In more detail, the reverse flow preventer 14 has an anode electrically connected to the high potential side terminal of the capacitor C1. The reverse flow preventer 14 has a cathode electrically connected to the second end 1b of the first inductor L1. The diode serving as the reverse flow preventer 14 is a diode for suppressing a resonance current in a circuit of the converter 12 (in more detail, the above closed circuit).

Hereinafter, an operation of the power supply device 100 is briefly described with reference to FIG. 1. Note that, primary part of the operation of the power supply device 100 is operation of the converter 12, and a basic operation of the converter 12 may be substantially the same as an operation of a general converter based on the SEPIC topology.

In the power supply device 100, when the switching device Q1 is switched from an off-state to an on-state, a current starts to flow through a path including the high potential side terminal of the capacitor C1, the reverse flow preventer 14, the first inductor L1, the switching device Q1, and the low potential side terminal of the capacitor C1. In the power supply device 100, when the switching device Q1 is switched from the off-state to the on-state, a current starts to flow through a path including the primary terminal of the capacitor C2, the switching device Q1, the second inductor L2, and the secondary terminal of the capacitor C2. In brief, in the power supply device 100, when the switching device Q1 is switched from the off-state to the on-state, energy is stored in the first inductor L1 and the second inductor L2.

In contrast, in the power supply device 100, when the switching device Q1 is switched from the on-state to the off-state, a counter electromotive force occurs in the first inductor L1. Consequently, in the power supply device 100, a current flows through a path including the first end 1a of the first inductor L1, the capacitor C2, the diode D1, the capacitor C3, the capacitor C1, the reverse flow preventer 14, and the second end 1b of the first inductor L1.

Additionally, in the power supply device 100, when the switching device Q1 is switched from the on-state to the off-state, a counter electromotive force occurs in the second inductor L2. Consequently, in the power supply device 100, a current flows through a path including the first end 2a of the second inductor L2, the diode D1, the capacitor C3, and the second end 2b of the second inductor L2.

Hereinafter, a power supply device 90 of Comparative Example 1, which is different from the power supply device 100 of the present embodiment only in not including the reverse flow preventer 14, is described with reference to FIG. 2.

Figure 2:
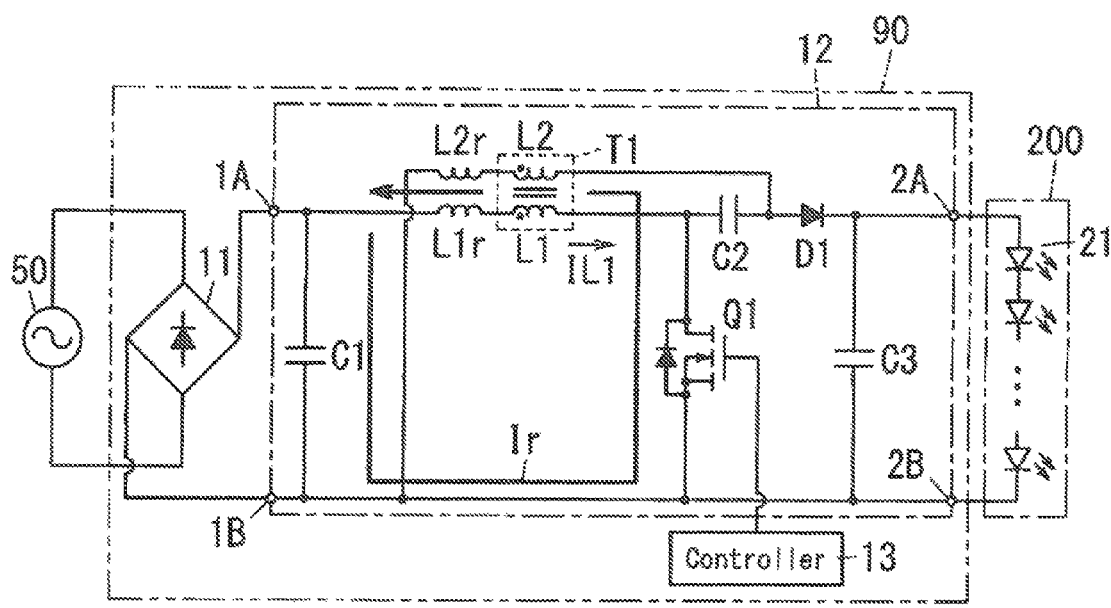
FIG. 2 is a diagram illustrating a path of a reactive current flowing through the power supply device of Comparative Example 1.

As shown in FIG. 2, the power supply device 90 of Comparative Example 1 has the same basic configuration as the power supply device 100. Note that, components of the power supply device 90 of Comparative Example 1 which are the same those of the power supply device 100 are designated by common reference signs to avoid redundant explanations. Note that, in FIG. 2, L1r represents a leakage inductance of the first inductor L1. Further, in FIG. 2, L2r represents a leakage inductance of the second inductor L2.

In the power supply device 90 of Comparative Example 1, in some cases, a resonance frequency determined by the leakage inductance of the transformer T1 and a capacitance of the converter 12 may be close to a driving frequency of the switching device Q1 (e.g., may fall within a range of plus-minus 5% of the driving frequency). In more detail, in the power supply device 90 of Comparative Example 1, the resonance frequency and the driving frequency may satisfy a formula (relation) (1) of $A = n \times B$, wherein "A" represents the resonance frequency and "B" represents the driving frequency. Note that, "n" represents a natural number. The leakage inductance of the transformer T1 is defined as a combined inductance of the leakage inductance L1r of the first inductor L1 and the leakage inductance L2r of the second inductor L2. The capacitance of the converter 12 is defined as a combined capacitance of the capacitance of the capacitor C1 and the capacitance of the capacitor C2.

Figure 3:
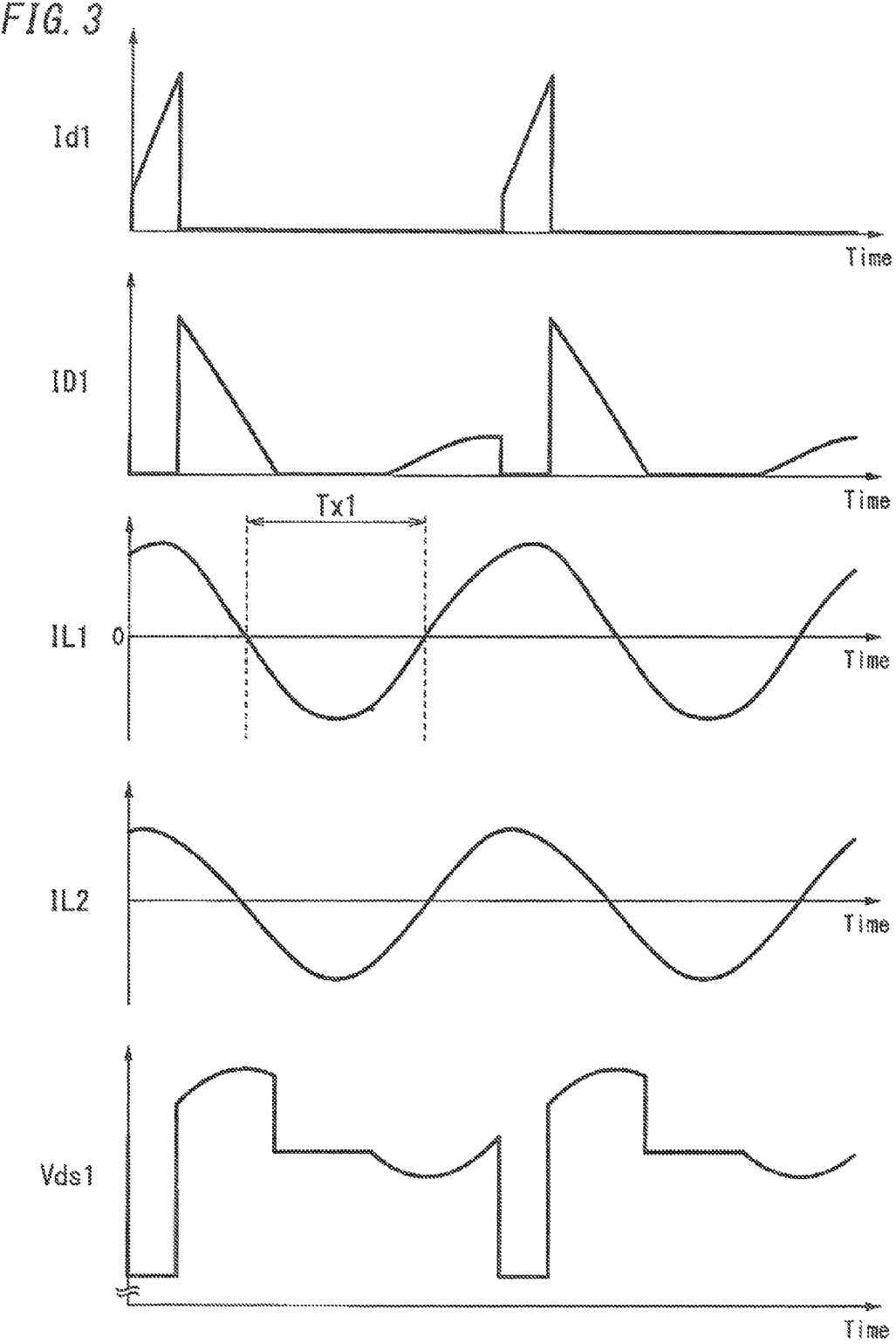
FIG. 3 is a timing chart of an operation of the power supply device of Comparative Example 1.

In the power supply device 90 of Comparative Example 1, when the resonance frequency and the driving frequency satisfy the above relation (1), a resonance circuit of the leakage inductance of the transformer T1 and the capacitance of the converter 12 causes oscillations of the current IL1 occurring in the first inductor L1 (see FIG. 3). Note that, in FIG. 3, Id1 represents a waveform of the drain current of the switching device Q1. In FIG. 3, ID1 represents a waveform of a current flowing through the diode D1. In FIG. 3, IL2 represents a waveform of a current flowing through the second inductor L2. In FIG. 3, Vds1 represents a waveform of a drain source voltage of the switching device Q1.

As apparent from the waveform diagram of the current IL1 in FIG. 3, in the power supply device 90 of Comparative Example 1, when the resonance frequency and the driving frequency satisfy the above relation (1), there is a time period (period Tx1 in FIG. 3) in which a reverse flow of the current IL1 of the first inductor L1 occurs. In other words, in the power supply device 90 of Comparative Example 1, when the resonance frequency and the driving frequency satisfy the above relation (1), a current flowing in an opposite direction to a direction of the discharging current from the capacitor C1 may occur. In summary, in the power supply device 90, when the resonance frequency and the driving frequency satisfy the above relation (1), as shown in FIG. 2, a current (reactive current) Ir which does not contribute to power transfer from the pair of input terminals 1A and 1B to the pair of output terminals 2A and 2B of the converter 12 may flow. As a result, in the power supply device 90 of Comparative Example 1, a resonance current in the circuit of the converter 12 may cause a decrease in the efficiency of power transfer. Note that, the efficiency of power transfer means a ratio represented by a value calculated by dividing a power outputted from the power supply device 100 by a power inputted into the power supply device 100.

Figure 4:
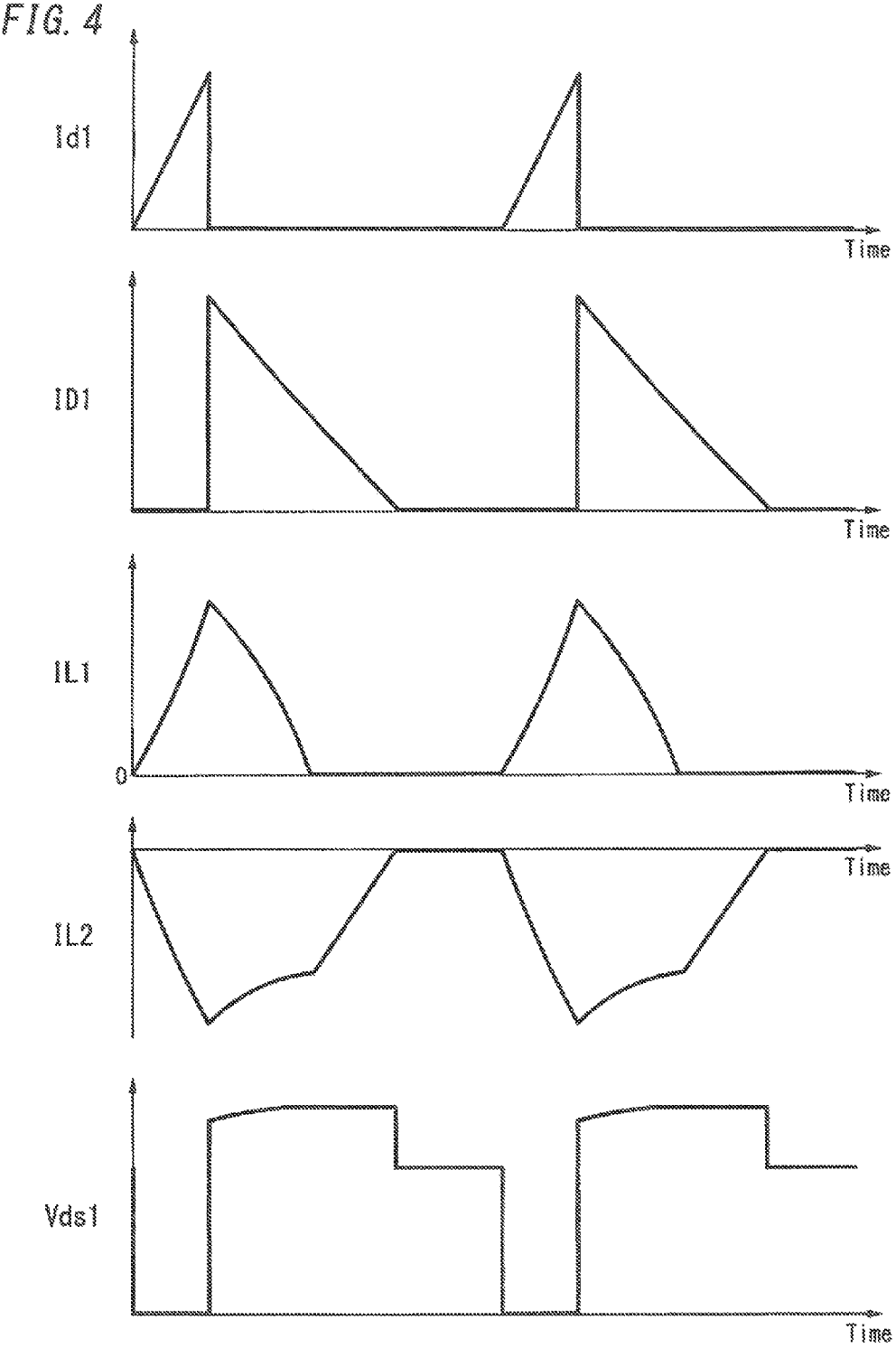
FIG. 4 is a timing chart of an operation of the power supply device of Embodiment 1.

In the power supply device 100, as shown in FIG. 1, the reverse flow preventer 14 is provided between the high potential side terminal of the capacitor C1 and the second end 1b of the first inductor L1. Therefore, the power supply device 100 can prevent a reverse flow of the current IL1 of the first inductor L1 which would otherwise occur when the resonance frequency and the driving frequency satisfy the above relation (1) (see FIG. 4). In other words, the power supply device 100 can suppress occurrence of the reactive current Ir as shown in FIG. 2, even if the resonance frequency and the driving frequency satisfy the above relation (1). Consequently, compared with the power supply device 90 of Comparative Example 1, the power supply device 100 can more suppress a resonance current in the circuit of the converter 12 and therefore more suppress a decrease in the efficiency of power transfer. Note that, Id1, ID1, IL2, and Vds1 in FIG. 4 represent physical amounts same as those represented by Id1, ID1, IL2, and Vds1 in FIG. 3.

The power supply device 100 of the present embodiment has transformer coupling of the first inductor L1 and the second inductor L2, and therefore can reduce a total area of regions of the circuit board which are occupied by the first inductor L1 and the second inductor L2, compared with a case in which transformer coupling of the first inductor L1 and the second inductor L2 is not made. In summary, it is possible to downsize the power supply device 100. Further, the power supply device 100 can suppress occurrence of the reactive current Ir, and therefore can more suppress a resonance current in the circuit of the converter 12 compared with the power supply device 90 of Comparative Example 1, and thus can more suppress a decrease in the efficiency of power transfer. In other words, the power supply device 100 of the present embodiment is capable of being downsized but nevertheless suppressing a decrease in the efficiency of power transfer.

In the power supply device 100 of the present embodiment, when the turn ratio of the transformer T1 is smaller than 1, resonance of a current IL2 flowing through the second inductor L2 is likely to be enhanced in a predetermined time period described below. The turn ratio of the transformer T1 is defined as a value calculated by dividing the number of turns of the second inductor L2 by the number of turns of the first inductor L1. In more detail, the turn ratio of the transformer T1 being smaller than 1 means that the number of turns of the second inductor L2 is smaller than the number of turns of the first inductor L1, and also means that the impedance of the second inductor L2 is lower than the impedance of the first inductor L1. The predetermined time period means a time period from a time when the switching device Q1 is switched to the on-state to a time when the reverse flow preventer 14 switches to a non-conductive state.

Figure 5:
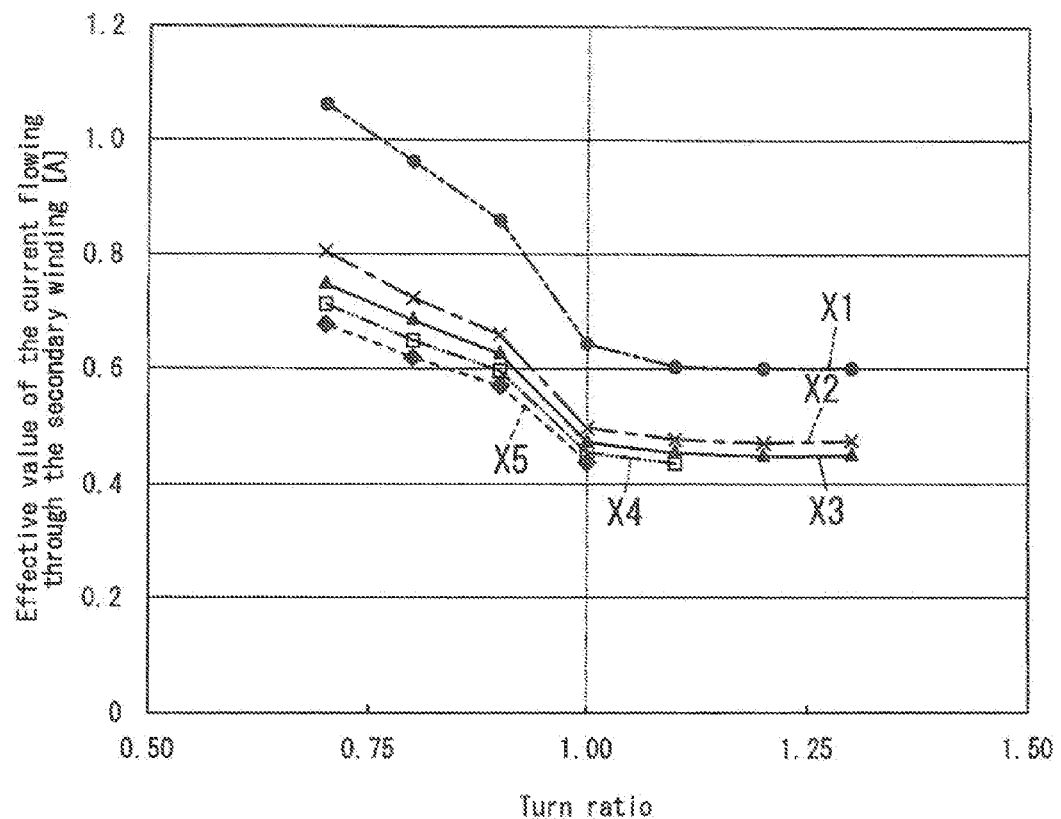
FIG. 5 relates to the power supply device of Embodiment 1 and is a correlation diagram of the turn ratio of the transformer and the effective value of the current flowing through the secondary winding.

Further, in the power supply device 100, when the turn ratio of the transformer T1 is smaller than 1, the effective value of the current IL2 flowing through the second inductor L2 increases with a decrease in the turn ratio of the transformer T1 as shown in FIG. 5. Note that, X1, X2, X3, X4, and X5 in FIG. 5 represent properties corresponding to inductances of the second inductor L2 of 100 μH, 250 μH, 300 μH, 350 μH, and 400 μH, respectively.

Figure 6:
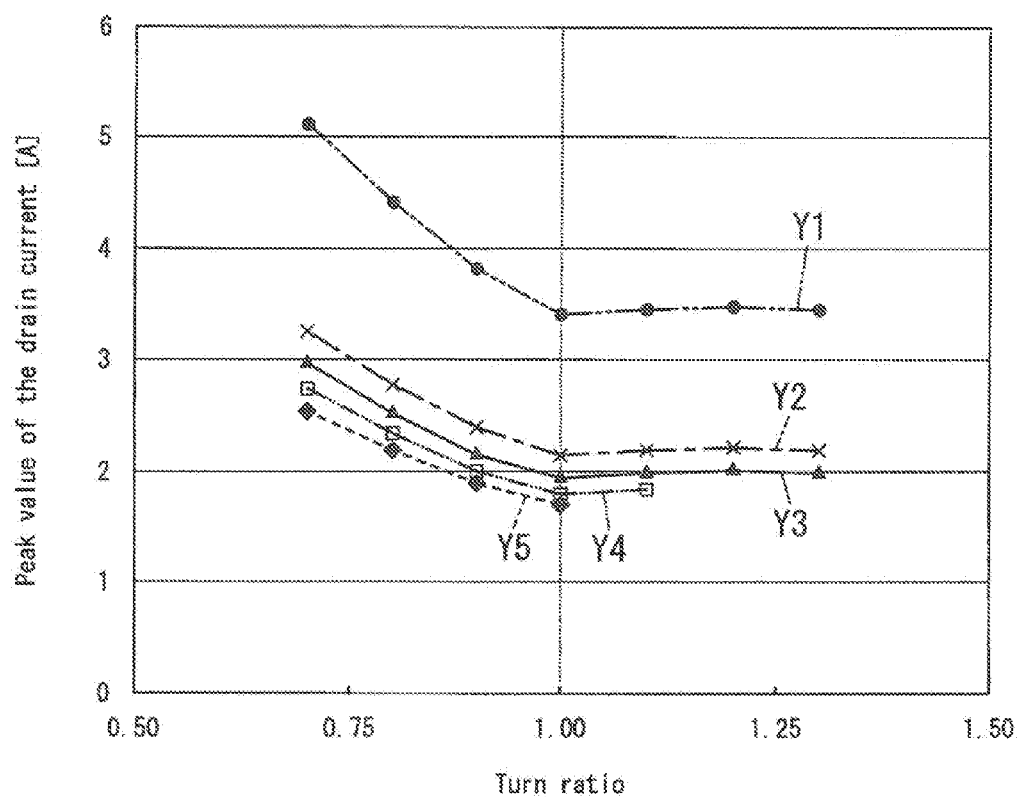
FIG. 6 relates to the power supply device of Embodiment 1 and is a correlation diagram of the turn ratio of the transformer and the peak value of the current flowing through the switching device.
Figure 7:
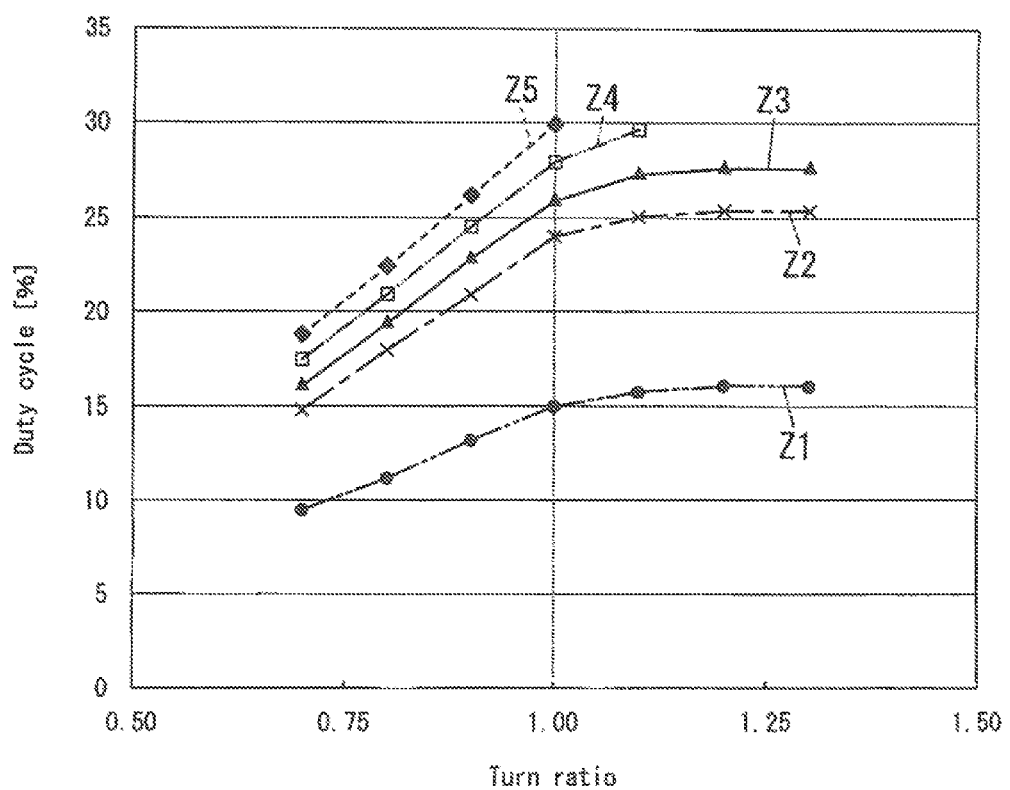
FIG. 7 relates to the power supply device of Embodiment 1 and is a correlation diagram of the turn ratio of the transformer and the duty cycle of the control signal.

In the power supply device 100, transformer coupling of the first inductor L1 and the second inductor L2 is made. Therefore, when resonance of the second inductor L2 occurs, oscillations of the current IL2 may cause oscillation of the current IL1 flowing through the first inductor L1. As a result, in the power supply device 100, when the turn ratio of the transformer T1 is smaller than 1, there is a possibility that the efficiency of power transfer decreases. Further, in the power supply device 100, when the turn ratio of the transformer T1 is smaller than 1, the peak value of the drain current of the switching device Q1 increases with a decrease in the turn ratio of the transformer T1 as shown in FIG. 6. Therefore, in the power supply device 100, in a case where the turn ratio of the transformer T1 is smaller than 1 and a predetermined DC output voltage is generated between the pair of output terminals 2A and 2B, it is necessary to decrease a duty cycle of the control signal with a decrease in the turn ratio of the transformer T1 as shown in FIG. 7. Note that, Y1, Y2, Y3, Y4, and Y5 in FIG. 6 correspond to the same examples as X1, X2, X3, X4, and X5 in FIG. 5. Further, Z1, Z2, Z3, Z4, and Z5 in FIG. 7 correspond to the same examples as X1, X2, X3, X4, and X5 in FIG. 5.

In view of this, the turn ratio of the transformer T1 may be preferably equal to or larger than 1, and be more preferably larger than 1. In these cases, in the power supply device 100, the impedance of the second inductor L2 is larger than the impedance of the first inductor L1, and thus oscillations of the current IL2 flowing through the second inductor L2 can be suppressed. Therefore, in the power supply device 100, oscillations of the current IL1 flowing through the first inductor L1 also can be suppressed, and thus a decrease in the efficiency of power transfer can be suppressed. In summary, the power supply device 100 of the present embodiment is capable of being downsized but nevertheless more suppressing a decrease in the efficiency of power transfer.

Further, in the power supply device 100, as apparent from the correlation diagrams shown in FIG. 5 and FIG. 6, when the turn ratio of the transformer T1 is equal to or greater than 1, the effective value of the current IL2 flowing through the second inductor L2 and the peak value of the drain current of the switching device Q1 become almost constant. Further, in the power supply device 100, as apparent from the correlation diagram shown in FIG. 7, when the turn ratio of the transformer T1 is equal to or greater than 1, the duty cycle of the control signal becomes almost constant. Therefore, in the power supply device 100, when the turn ratio of the transformer T1 is equal to or larger than 1 and the predetermined DC output voltage is generated between the pair of output terminals 2A and 2B of the converter 12, there is no need to change the duty cycle of the control signal depending on the turn ratio of the transformer T1. In other words, in the power supply device 100, when the turn ratio of the transformer T1 is equal to or larger than 1, it is possible to facilitate generation of the predetermined DC output voltage between the pair of output terminals 2A and 2B of the converter 12 irrespective of the turn ratio of the transformer T1. As a result, in the power supply device 100, when the turn ratio of the transformer T1 is equal to or larger than 1, it is possible to easily change a magnitude of the DC output voltage from the pair of output terminals 2A and 2B of the converter 12. Therefore, when the turn ratio of the transformer T1 is set to be equal to or larger than 1, the power supply device 100 is capable of being downsized but nevertheless more suppressing a decrease in the efficiency of power transfer, and facilitating change of a light output of the light source unit 200. In short, the turn ratio may be selected from a predetermined range of turn ratios in which a predetermined value is kept almost constant irrespective of a change in the turn ratio. The predetermined value may be the effective value of the current IL2 flowing through the second inductor L2, the peak value of the drain current of the switching device Q1, or the duty cycle of the control signal, for example. The predetermined range can be determined by simulation or the like, and in many cases has a lower limit of 1. Note that, it is preferable that the controller 13 be configured to operate the switching device Q1 in the discontinuous mode irrespective of a dimming level of the light source unit 200. The dimming level of the light source unit 200 means a degree (amount) of the light output of the light source unit 200. The dimming level of 100% corresponds to the degree of the light output of the light source unit 200 at full power lighting.

Figure 8:
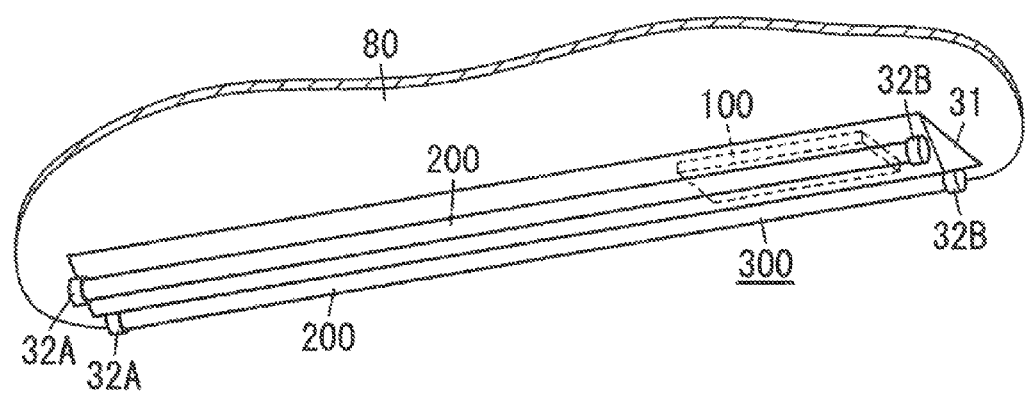
FIG. 8 is a perspective view of the lighting fixture including the power supply device of Embodiment 1 in an installed state.

Hereinafter, one example of a lighting fixture 300 including the power supply device 100 of Embodiment 1 is described with reference to FIG. 8.

The lighting fixture 300 is designed to be directly attached to a ceiling material 80. The lighting fixture 300 is a base light.

The lighting fixture 300 includes the power supply device 100, one or more light source units 200, and a fixture body 31.

The light source unit 200 is a straight LED lamp. In the present embodiment, the lighting fixture 300 includes two light source units 200.

The fixture body 31 is designed to accommodate the power supply device 100. Further, the fixture body 31 is designed to hold (support) the one or more light source units 200.

The fixture body 31 includes one of more pairs of holding members 32A and 32B for holding the one or more light source units 200. In the present embodiment, the fixture body 31 includes two pairs of holding members 32A and 32B.

Note that, the lighting fixture 300 is designed to be directly attached to the ceiling material 80, but may have another configuration. For example, the lighting fixture 300 may be deigned to be recessed in the ceiling material 80. Note that, the lighting fixture 300 is a base light, but may be another light such as a downlight.

Note that, in one modification of the present embodiment, the power supply device 100 may be configured so that the reverse flow preventer 14 is provided between the low potential side terminal of the capacitor C1 and a connection point P1 of the second end 2b of the second inductor L2 and the source terminal of the switching device Q1. In this modification, the anode of the reverse flow preventer 14 is electrically connected to the connection point P1, and the cathode of the reverse flow preventer 14 is electrically connected to the low potential side terminal of the capacitor C1.

Embodiment 2

Figure 9:
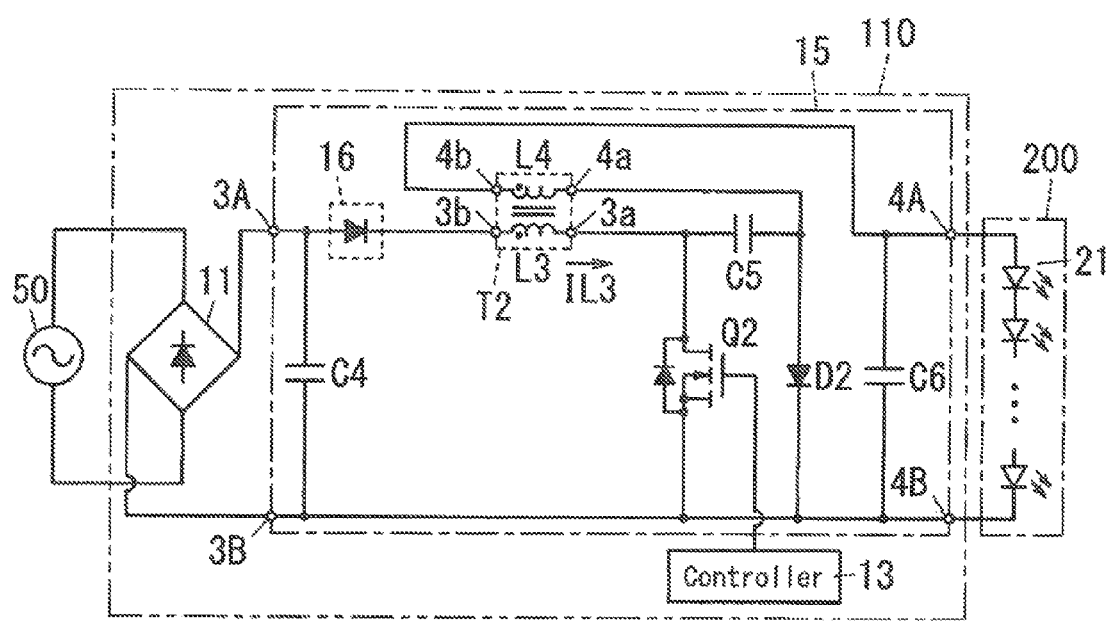
FIG. 9 is a circuit diagram of the lighting fixture including the power supply device of Embodiment 2.

The following description referring to FIG. 9 is made to a power supply device 110 of the present embodiment.

The power supply device 110 of the present embodiment has the same basic configuration as the power supply device 100 of Embodiment 1. As shown in FIG. 9, a converter 15 of the power supply device 110 is different from the converter 12 of the power supply device 100 of Embodiment 1. Note that, components of the power supply device 110 which are the same as those of the power supply device 100 of Embodiment 1 are designated by common reference signs to avoid redundant explanations.

The converter 15 is a converter based on a auk topology. Note that, the converter 15 is described only with regard to differences between the converter 15 and the converter 12.

The converter 15 includes a series circuit of a capacitor (input capacitor) C4, a primary winding (hereinafter, referred to as "third inductor") L3 of a transformer T2, and a switching device Q2. Moreover, the converter 15 includes a series circuit of a capacitor C5 and a diode (output diode) D2, and a series circuit of a secondary winding (hereinafter, referred to as "fourth inductor") L4 of the transformer T2 and a capacitor (output capacitor) C6. In the present embodiment, the series circuit of the capacitor C4, the third inductor L3, and the switching device Q2 forms a closed circuit including the capacitor C4, the third inductor L3, and the switching device Q2. Note that, a coupling coefficient of the third inductor L3 and the fourth inductor L4 may be 0.84, for example.

The capacitor C5 has a secondary terminal electrically connected to an anode of the diode D2. The diode D2 has a cathode electrically connected to a source terminal of the switching device Q2.

The secondary terminal of the capacitor C5 is electrically connected to a first end 4a of the fourth inductor L4. The fourth inductor L4 has a second end 4b electrically connected to a high potential side terminal of the capacitor C6. The capacitor C6 has a low potential side terminal electrically connected to the cathode of the diode D2.

Hereinafter, an operation of the power supply device 110 of the present embodiment is briefly described with reference to FIG. 9. Note that, primary part of the operation of the power supply device 110 is operation of the converter 15, and a basic operation of the converter 15 may be substantially the same as an operation of a general converter based on the auk topology.

In the power supply device 110, when the switching device Q2 is switched from an off-state to an on-state, a current starts to flow through a path including a high potential side terminal of the capacitor C4, a reverse flow preventer 16, the third inductor L3, the switching device Q2, and the low potential side terminal of the capacitor C4. In the power supply device 110, when the switching device Q2 is switched from the off-state to the on-state, a current starts to flow through a path including the high potential side terminal of the capacitor C6, the fourth inductor L4, the capacitor C5, the switching device Q2, and the low potential side terminal of the capacitor C6. In brief, in the power supply device 110, when the switching device Q2 is switched from the off-state to the on-state, energy is stored in the third inductor L3 and the fourth inductor L4.

In contrast, in the power supply device 110, when the switching device Q2 is switched from the on-state to the off-state, a counter electromotive force occurs in the third inductor L3. Consequently, in the power supply device 110, a current flows through a path including a first end 3a of the third inductor L3, the capacitor C5, the diode D2, the capacitor C4, the reverse flow preventer 16, and a second end 3b of the third inductor L3.

Additionally, in the power supply device 110, when the switching device Q2 is switched from the on-state to the off-state, a counter electromotive force occurs in the fourth inductor L4. Consequently, in the power supply device 110, a current flows through a path including the first end 4a of the fourth inductor L4, the diode D2, the capacitor C6, and the second end 4b of the fourth inductor L4.

Hereinafter, a power supply device of Comparative Example 2, which is different from the power supply device 110 of the present embodiment only in not including the reverse flow preventer 16, is described. The power supply device of Comparative Example 2 has the same basic configuration as the power supply device 110. Note that, components of the power supply device of Comparative Example 2 which are same as those of the power supply device 110 are designated by common reference signs to avoid redundant explanations and drawings.

Figure 10:
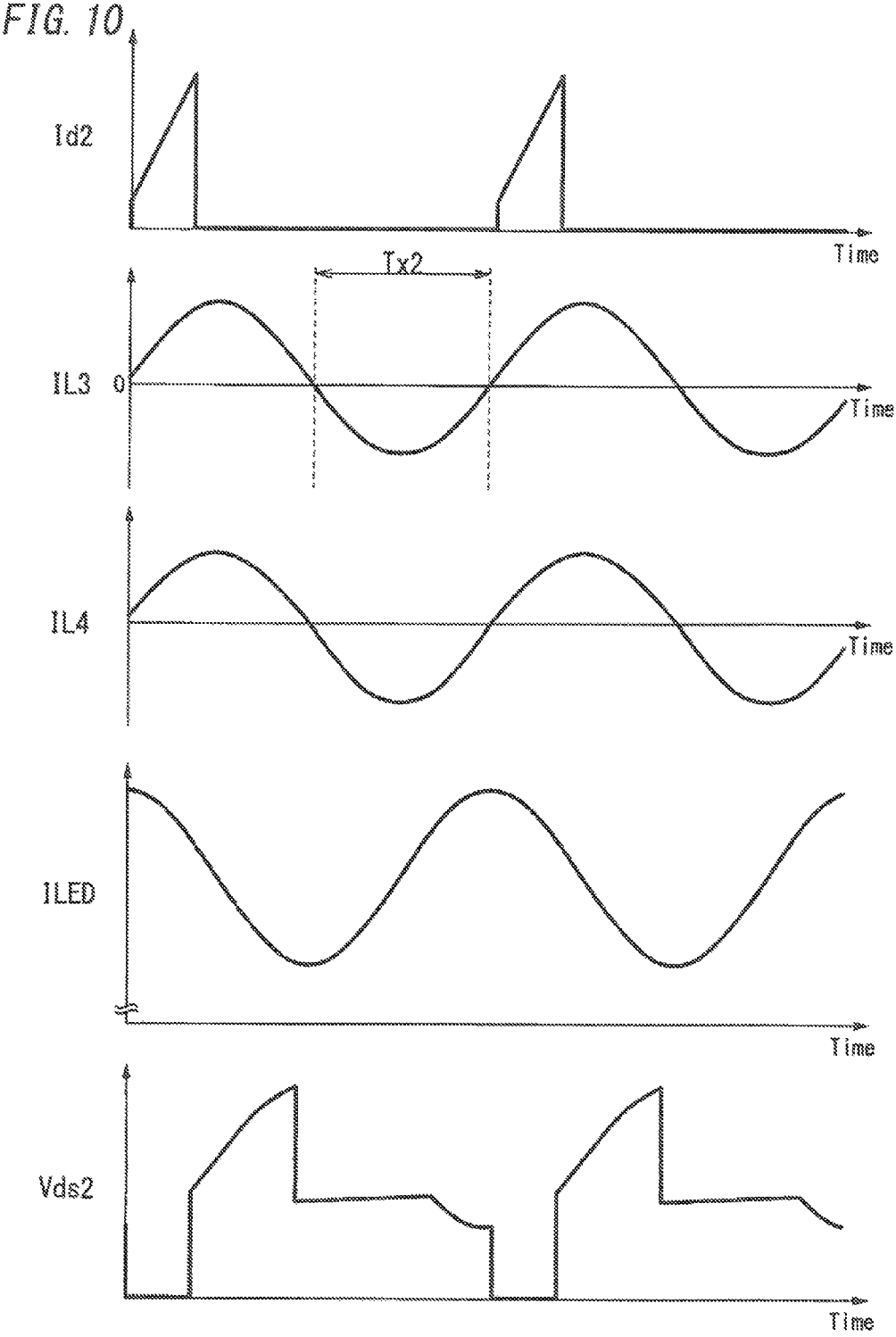
FIG. 10 is a timing chart of an operation of the power supply device of Comparative Example 2.

In the power supply device of Comparative Example 2, in some cases, a resonance frequency determined by a leakage inductance of the transformer T2 and a capacitance of the converter 15 may be close to a driving frequency of the switching device Q2 as with the power supply device 90 of Comparative Example 1. In the power supply device of Comparative Example 2, when the resonance frequency and the driving frequency satisfy the above relation (1), a resonance circuit of the leakage inductance of the transformer T2 and the capacitance of the converter 15 causes oscillations of a current IL3 occurring in the third inductor L3 (see FIG. 10). Note that, in FIG. 10, Id2 represents a waveform of a drain current of the switching device Q2. In FIG. 10, IL4 represents a waveform of a current flowing through the fourth inductor L4. In FIG. 10, ILED represents a waveform of a current flowing through the light source unit 200. In FIG. 10, Vds2 represents a waveform of a drain source voltage of the switching device Q2.

As apparent from the waveform diagram of the current IL3 in FIG. 10, in the power supply device of Comparative Example 2, when the resonance frequency and the driving frequency satisfy the above relation (1), there is a time period (period Tx2 in FIG. 10) in which a reverse flow of the current IL3 of the third inductor L3 occurs. In other words, in the power supply device of Comparative Example 2, as with the power supply device 90 of Comparative Example 1, a current (reactive current) flowing in an opposite direction to a direction of the discharging current from the capacitor C4 may occur.

Figure 11:
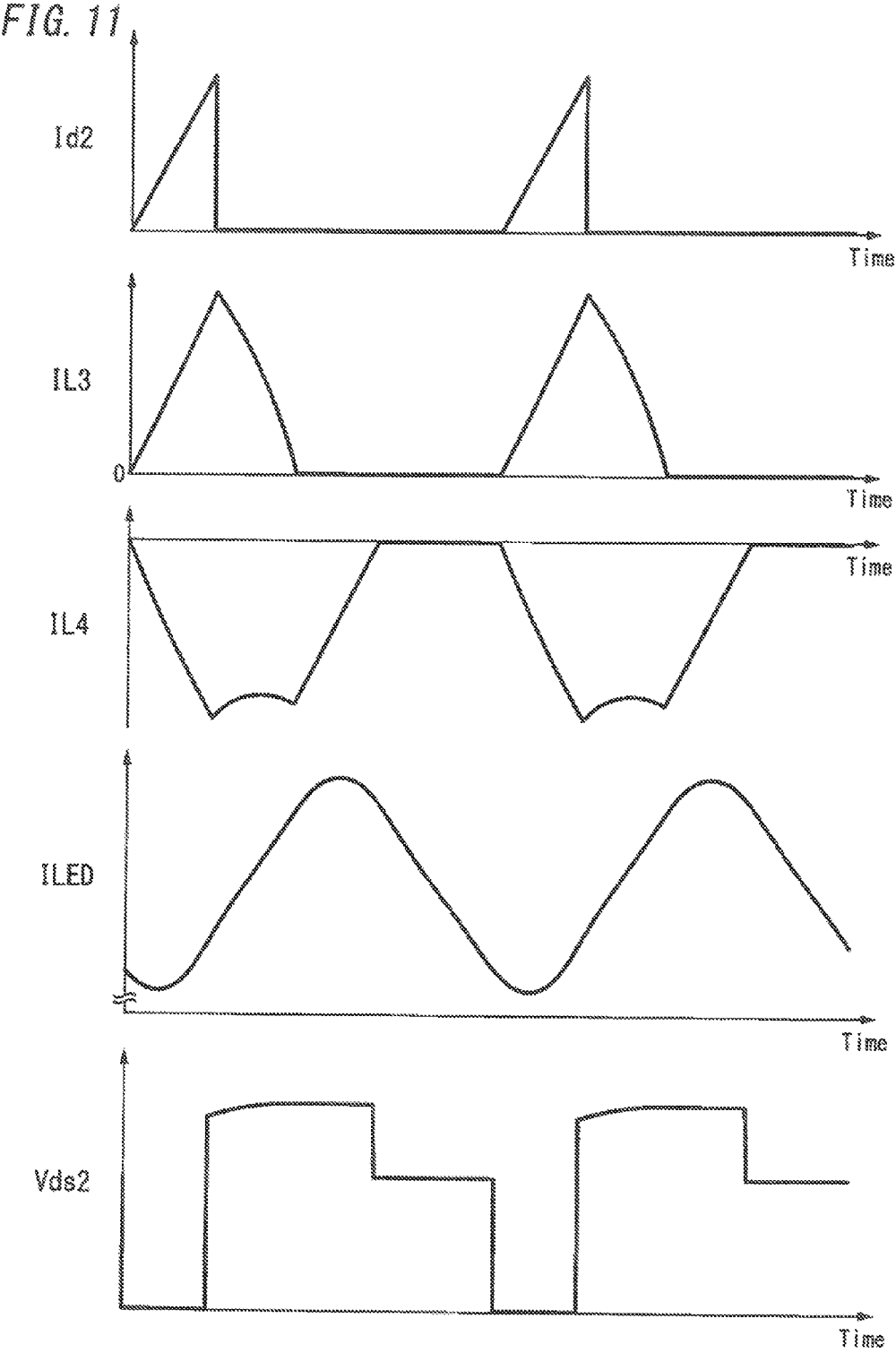
FIG. 11 is a timing chart of an operation of the power supply device of Embodiment 2.

The power supply device 110 of the present embodiment, as shown in FIG. 9 includes a reverse flow preventer 16 provided between the high potential side terminal of the capacitor C4 and a second end 3b of the third inductor L3. Therefore, the power supply device 110 can prevent a reverse flow of a current IL3 of the third inductor L3 which would otherwise occur when the resonance frequency and the driving frequency satisfy the above relation (1) (see FIG. 11). In other words, the power supply device 110 can suppress occurrence of a reactive current even if the resonance frequency and the driving frequency satisfy the above relation (1). Note that, Id2, IL4, ILED, and Vds2 in FIG. 11 represent physical amounts same as those represented by Id2, IL4, ILED, and Vds2 in FIG. 10.

The transformer T2 may preferably have a turn ratio equal to or larger than 1, and more preferably have a turn ratio larger than 1. The turn ratio of the transformer T2 is defined as a value calculated by dividing the number of turns of the fourth inductor L4 by the number of turns of the third inductor L3. In this case, in the power supply device 110, an impedance of the fourth inductor L4 is higher than an impedance of the third inductor L3, and therefore oscillations of the current IL4 flowing through the fourth inductor L4 can be suppressed. Consequently, the power supply device 110 also can suppress oscillations of the current IL3 flowing through the third inductor L3, and a decrease in the efficiency of power transfer can be more suppressed. In summary, the power supply device 110 is capable of being downsized but nevertheless suppressing a decrease in the efficiency of power transfer.

Note that, the power supply device 110 of the present embodiment may be provided to the lighting fixture 300 in addition to or instead of the power supply device 100 of Embodiment 1.

Embodiment 3

Figure 12:
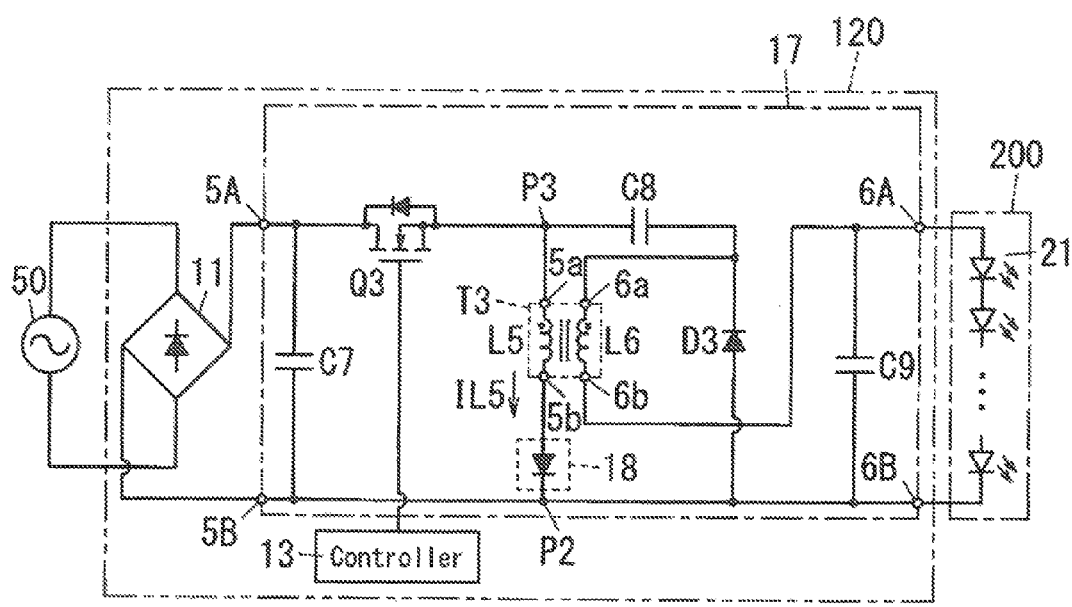
FIG. 12 is a circuit diagram of the lighting fixture including the power supply device of Embodiment 3.

The following description referring to FIG. 12 is made to a power supply device 120 of the present embodiment.

The power supply device 120 of the present embodiment has the same basic configuration as the power supply device 100 of Embodiment 1. As shown in FIG. 12, a converter 17 of the power supply device 120 is different from the converter 12 of the power supply device 100 of Embodiment 1. Note that, components of the power supply device 120 which are the same as those of the power supply device 100 of Embodiment 1 are designated by common reference signs to avoid redundant explanations.

The converter 17 is a converter based on a Zeta topology. Note that, the converter 17 is described only with regard to differences between the converter 17 and the converter 12.

The converter 17 includes a series circuit of a capacitor (input capacitor) C7, a switching device Q3, and a primary winding (hereinafter, referred to as "fifth inductor") L5 of a transformer T3. Moreover, the converter 17 includes a series circuit of a capacitor C8 and a diode (output diode) D3, and a series circuit of a secondary winding (hereinafter, referred to as "sixth inductor") L6 of the transformer T3 and a capacitor (output capacitor) C9. In the present embodiment, the series circuit of the capacitor C7, the fifth inductor L5, and the switching device Q3 forms a closed circuit including the capacitor C7, the fifth inductor L5, and the switching device Q3. Note that, a coupling coefficient of the fifth inductor L5 and the sixth inductor L6 may be 0.93, for example.

The switching device Q3 has a drain terminal electrically connected to a high potential side terminal of the capacitor C7. The switching device Q3 has a source terminal electrically connected to a first end 5a of the fifth inductor L5. The fifth inductor L5 has a second end 5b electrically connected to a low potential side terminal of the capacitor C7.

The capacitor C8 has a secondary terminal electrically connected to a cathode of the diode D3. The diode D3 has an anode electrically connected to the second end 5b of the fifth inductor L5.

The cathode of the diode D3 is electrically connected to a first end 6a of the sixth inductor L6. The sixth inductor L6 has a second end 6b electrically connected to a high potential side terminal of the capacitor C9. The capacitor C9 has a low potential side terminal electrically connected to the anode of the diode D3. The present embodiment includes a reverse flow preventer 18 provided between the second end 5b of the fifth inductor L5 and a connection point P2 of the low potential side terminal of the capacitor C7 and the anode of the diode D3. The reverse flow preventer 18 has a function same as the function of the reverse flow preventer 14 of the power supply device 100 of Embodiment 1.

The reverse flow preventer 18 has an anode electrically connected to the second end 5b of the fifth inductor L5. The reverse flow preventer 18 has a cathode electrically connected to the connection point P2.

Hereinafter, an operation of the power supply device 120 of the present embodiment is briefly described with reference to FIG. 12. Note that, primary part of the operation of the power supply device 120 is operation of the converter 17, and a basic operation of the converter 17 may be substantially the same as an operation of a general converter based on the Zeta topology.

In the power supply device 120, when the switching device Q3 is switched from an off-state to an on-state, a current starts to flow through a path including the high potential side terminal of the capacitor C7, the switching device Q3, the fifth inductor L5, the reverse flow preventer 18, and the low potential side terminal of the capacitor C7. Further, in the power supply device 120, when the switching device Q3 is switched from the off-state to the on-state, a current starts to flow through a path including the high potential side terminal of the capacitor C7, the switching device Q3, the capacitor C8, the sixth inductor L6, the capacitor C9, and the low potential side terminal of the capacitor C7. In brief, in the power supply device 120, when the switching device Q3 is switched from the off-state to the on-state, energy is stored in the fifth inductor L5 and the sixth inductor L6.

In contrast, in the power supply device 120, when the switching device Q3 is switched from the on-state to the off-state, a counter electromotive force occurs in the fifth inductor L5. Consequently, in the power supply device 120, a current flows through a path including the second end 5b of the fifth inductor L5, the reverse flow preventer 18, the diode D3, the capacitor C8, and the first end 5a of the fifth inductor L5.

Additionally, in the power supply device 120, when the switching device Q3 is switched from the on-state to the off-state, a counter electromotive force occurs in the sixth inductor L6. Consequently, in the power supply device 120, a current flows through a path including the second end 6b of the sixth inductor L6, the capacitor C9, the diode D3, and the first end 6a of the sixth inductor L6.

Hereinafter, a power supply device of Comparative Example 3, which is different from the power supply device 120 of the present embodiment only in not including the reverse flow preventer 18, is described. The power supply device of Comparative Example 3 has the same basic configuration as the power supply device 120. Note that, components of the power supply device of Comparative Example 3 which are same as those of the power supply device 120 are designated by common reference signs to avoid redundant explanations and drawings.

In the power supply device of Comparative Example 3, in some cases, a resonance frequency determined by a leakage inductance of the transformer T3 and a capacitance of the converter 17 may be close to a driving frequency of the switching device Q3 as with the power supply device 90 of Comparative Example 1. In the power supply device of Comparative Example 3, when the resonance frequency and the driving frequency satisfy the above relation (1), a resonance circuit of the leakage inductance of the transformer T3 and the capacitance of the converter 17 causes oscillations of a current IL5 occurring in the fifth inductor L5 (see FIG. 13). Note that, in FIG. 13, Id3 represents a waveform of a drain current of the switching device Q3. In FIG. 13, IL6 represents a waveform of a current flowing through the sixth inductor L6. In FIG. 13, ILED represents a waveform of a current flowing through the light source unit 200. In FIG. 13, Vds3 represents a waveform of a drain source voltage of the switching device Q3.

As apparent from the waveform diagram of the current IL5 in FIG. 13, in the power supply device of Comparative Example 3, when the resonance frequency and the driving frequency satisfy the above relation (1), there is a time period (period Tx3 in FIG. 13) in which a reverse flow of the current IL5 of the fifth inductor L5 occurs. In other words, in the power supply device of Comparative Example 3, as with the power supply device 90 of Comparative Example 1, a current (reactive current) flowing in an opposite direction to a direction of the discharging current from the capacitor C7 may occur.

The power supply device 120 of the present embodiment, as shown in FIG. 12 includes the reverse flow preventer 18 provided between the second end 5b of the fifth inductor L5 and the connection point P2. Therefore, the power supply device 120 can prevent a reverse flow of the current IL5 of the fifth inductor L5 which would otherwise occur when the resonance frequency and the driving frequency satisfy the above relation (1) (see FIG. 14). In other words, the power supply device 120 can suppress occurrence of a reactive current even if the resonance frequency and the driving frequency satisfy the above relation (1). Note that, Id3, IL6, ILED, and Vds3 in FIG. 14 represent physical amounts same as those represented by Id3, IL6, ILED, and Vds3 in FIG. 13.

The transformer T3 may preferably have a turn ratio equal to or larger than 1, and more preferably have a turn ratio larger than 1. The turn ratio of the transformer T3 is defined as a value calculated by dividing the number of turns of the sixth inductor L6 by the number of turns of the fifth inductor L5. In this case, in the power supply device 120, an impedance of the sixth inductor L6 is higher than an impedance of the fifth inductor L5, and therefore oscillations of the current IL6 flowing through the sixth inductor L6 can be suppressed. Consequently, the power supply device 120 also can suppress oscillations of the current IL5 flowing through the fifth inductor L5, and a decrease in the efficiency of power transfer can be more suppressed. In summary, the power supply device 120 is capable of being downsized but nevertheless suppressing a decrease in the efficiency of power transfer.

Note that, the power supply device 120 of the present embodiment may be provided to the lighting fixture 300 in addition to or instead of the power supply device 100 of Embodiment 1.

Note that, in one modification of the present embodiment, the power supply device 120 may be configured so that the reverse flow preventer 18 is provided between a connection point P3 of the source terminal of the switching device Q3 and the capacitor C8 and the first end 5a of the fifth inductor L5. In this modification, the anode of the reverse flow preventer 18 is electrically connected to the connection point P3, and the cathode of the reverse flow preventer 18 is electrically connected to the first end 5a of the fifth inductor L5.

Other Embodiments

Embodiments 1 to 3 are merely some of embodiments according to the present disclosure. The embodiments according to the present disclosure are not limited to Embodiments 1 to 3, and Embodiments 1 to 3 may be modified in various ways in conformity with designs or the like, providing that they can achieve the objective of the present disclosure.

For example, in Embodiments 1 to 3, the power supply device (100; 110; 120) may be configured to operate the light source unit (200) by use of power from a DC power supply. This may mean that the power supply device (100; 110; 120) need not include the diode bridge (11) necessarily.

In Embodiments 1 to 3, the reverse flow preventer (14; 16; 18) is a diode, but may be a MOSFET, thyristor, or the like.

In Embodiments 1 to 3, the switching device (Q1) is an enhancement n-channel MOSFET, but may not be limited to this.

In Embodiments 1 to 3, the controller (13) includes the one or more microprocessors, but may include at least one microcontroller, at least one application specific integrated circuit (ASIC), or the like.

In Embodiments 1 to 3, the multiple solid light emitting devices 21 are connected in series, but may be connected in parallel, or in series-parallel, for example. Further, the number of solid light emitting devices 21 is two or more, but may be one. The solid light emitting device 21 is an LED, but may be a semiconductor laser device, an organic electroluminescence element, or the like. The emission color of the solid light emitting device 21 is white but may be another color.

Aspects According to the Present Disclosure

As apparent from the embodiments according to the present disclosure, the power supply device (100; 110; 120) of the first aspect in accordance with the present disclosure includes a converter (12; 15; 17) and a controller (13). The converter (12; 15; 17) includes a pair of input terminals (1A; 3A; 5A, 1B; 3B; 5B), a pair of output terminals (2A; 4A; 6A, 2B; 4B; 6B), a transformer (T1; T2; T3) including a primary winding (L1; L3; L5) and a secondary winding (L2; L4; L6) which are magnetically coupled, a capacitor (C1; C4; C7), and a switching device (Q1; Q2; Q3). The controller (13) is configured to control the switching device (Q1; Q2; Q3). The capacitor (C1; C4; C7) is electrically connected between the pair of input terminals (1A; 3A; 5A, 1B; 3B; 5B). The capacitor (C1; C4; C7), the primary winding (L1; L3; L5), and the switching device (C1; C4; C7) are connected in series in a closed circuit. The converter (12; 15; 17) is configured to, when the switching device (Q1; Q2; Q3) is switched to an on-state, store energy inputted through the pair of input terminals (1A; 3A; 5A, 1B; 3B; 5B) in the primary winding (L1; L3; L5) and the secondary winding (L2; L4; L6), and, when the switching device (Q1; Q2; Q3) is switched to an off-state, produce a DC output voltage between the pair of output terminals (2A; 4A; 6A, 2B; 4B; 6B) by use of energy stored in the primary winding (L1; L3; L5) and the secondary winding (L2; L4; L6). The converter (12; 15; 17) further includes a reverse flow preventer (14; 16; 18) for preventing, when the switching device (Q1; Q2; Q3) is switched to the off-state, a current from flowing through the closed circuit in an opposite direction to a direction of a discharging current from the capacitor (C1; C4; C7).

According to the power supply device (100; 110; 120) of the first aspect, the reverse flow preventer (14; 16; 18) can suppress occurrence of a reactive current (Ir) even if the resonance frequency and the driving frequency satisfy the above relation (1). Therefore, the power supply device (100; 110; 120) is capable of being downsized but nevertheless suppressing a decrease in the efficiency of power transfer.

The power supply device (100; 110; 120) of the second aspect in accordance with the present disclosure can be realized in combination with the first aspect. In the second aspect, the converter (12; 15; 17) includes a coupling capacitor (C2; C5; C8) for electrically insulating the pair of input terminals (1A; 3A; 5A, 1B; 3B; 5B) from the pair of output terminals (2A; 4A; 6A, 2B; 4B; 6B) with regard to a DC current. The coupling capacitor (C2; C5; C8) has a primary terminal electrically connected to the primary winding (L1; L3; L5). The coupling capacitor (C2; C5; C8) has a secondary terminal electrically connected to the secondary winding (L2; L4; L6). In other words, the converter (12; 15; 17) includes a coupling capacitor (C2; C5; C8) connected between the primary winding (L1; L3; L5) and the secondary winding (L2; L4; L6).

According to the power supply device (100; 110; 120) of the second aspect, it is possible to electrically insulate the diode bridge (11) electrically connected to the pair of input terminals (1A; 3A; 5A, 1B; 3B; 5B) from the light source unit (200) electrically connected to the pair of output terminals (2A; 4A; 6A, 2B; 4B; 6B) with regard to a DC current.

The power supply device (100; 110; 120) of the third aspect in accordance with the present disclosure can be realized in combination with the first or second aspect. In the third aspect, a turn ratio of the transformer (T1; T2; T3) defined as a value calculated by dividing a number of turns of the secondary winding (L2; L4; L6) by a number of turns of the primary winding (L1; L3; L5) is equal to or larger than 1.

According to the power supply device (100; 110; 120) of the third aspect, the impedance of the secondary winding (L2; L4; L6) is higher than the impedance of the first winding (L1; L3; L5), and therefore oscillations of the current (IL2; IL4; IL6) flowing through the secondary winding (L2; L4; L6) can be suppressed. Therefore, the power supply device (100; 110; 120) can suppress oscillations of the current (IL1; IL3; IL5) flowing through the primary winding (L1; L3; L5), and thus a decrease in the efficiency of power transfer can be more suppressed.

The power supply device (100; 110; 120) of the fourth aspect in accordance with the present disclosure can be realized in combination with any one of the first to third aspects. In the fourth aspect, the controller (13) is configured to control the switching device (Q1; Q2; Q3) so that the converter (12; 15; 17) operates in a discontinuous mode.

According to the power supply device (100; 110; 120) of the fourth aspect, the controller (13) turns on the switching device (Q1; Q2; Q3) after a current flowing through the diode (D1; D2; D3) becomes zero. Therefore, it is possible to suppress occurrence of a recovery current in the diode (D1; D2; D3). In other words, the power supply device (100; 110; 120) can suppress occurrence of a loss due to the diode (D1; D2; D3).

The power supply device (100; 110; 120) of the fifth aspect in accordance with the present disclosure can be realized in combination with any one of the first to fourth aspects. In the fifth aspect, the converter (12; 15; 17) is a converter based on any one of an SEPIC topology, a auk topology, and a Zeta topology.

According to the power supply device (100) of the fifth aspect, when the converter (12) is a converter based on the SEPIC topology, the power supply device (100) can offer an advantage of the SEPIC and is capable of being downsized but nevertheless suppressing a decrease in the efficiency of power transfer. According to the power supply device (110) of the fifth aspect, when the converter (15) is a converter based on the auk topology, the power supply device (110) is capable of being downsized but nevertheless suppressing a decrease in the efficiency of power transfer. According to the power supply device (120) of the fifth aspect, when the converter (17) is a converter based on the Zeta topology, the power supply device (120) is capable of being downsized but nevertheless suppressing a decrease in the efficiency of power transfer.

The power supply device (100; 110; 120) of the sixth aspect in accordance with the present disclosure can be realized in combination with any one of the first to fifth aspects. In the sixth aspect, the reverse flow preventer (14; 16; 18) includes a diode electrically connected in series with the primary winding (L1; L3; L5) and the switching device (Q1; Q2; Q3) between opposite ends of the capacitor (C1; C4; C7) so as to allow the discharging current from the capacitor (C1; C4; C7) to flow through the reverse flow preventer (14; 16; 18).

According to the power supply device (100; 110; 120) of the sixth aspect, it is possible to simplify the configuration of the power supply device (100; 110; 120).

The lighting fixture (300) of the seventh aspect in accordance with the present disclosure includes the power supply device (100; 110; 120) of any one of the first to sixth aspects and a light source unit (200) to operate with power supplied from the power supply device (100; 110; 120). In other words, the lighting fixture (300) includes a light source unit (200), and the power supply device (100; 110; 120) of any one of the first to sixth aspects, for operating the light source unit (200).

Consequently, it is possible to propose the lighting fixture (300) including the power supply device (100; 110; 120) capable of being downsized but nevertheless suppressing a decrease in the efficiency of power transfer.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A power supply device serving as a DC power supply, comprising:
   a converter including a pair of input terminals, a pair of output terminals, a transformer including a primary winding and a secondary winding which are magnetically coupled, a capacitor, and a switching device; and
   a controller configured to control the switching device,
   the capacitor being electrically connected between the pair of input terminals,
   the capacitor, the primary winding, and the switching device being connected in series in a closed circuit,
   the converter being configured to, when the switching device is switched to an on-state, store energy inputted through the pair of input terminals in the primary winding and the secondary winding, and, when the switching device is switched to an off-state, produce a DC output voltage between the pair of output terminals by use of energy stored in the primary winding and the secondary winding,
   the converter further including a reverse flow preventer for preventing, when the switching device is switched to the off-state, a current from flowing through the closed circuit in an opposite direction to a direction of a discharging current from the capacitor, and
   the converter further including a coupling capacitor connected between the primary winding and the secondary winding,
   the coupling capacitor having:
      a primary terminal electrically connected to a first end of the primary winding; and
      a secondary terminal electrically connected to a first end of the secondary winding,
   the primary winding having a second end electrically connected to a first terminal of the capacitor, and
   the secondary winding having a second end electrically connected to a second terminal of the capacitor.

2. The power supply device of claim 1, wherein
   a turn ratio of the transformer defined as a value calculated by dividing a number of turns of the secondary winding by a number of turns of the primary winding is equal to or larger than 1.

3. The power supply device of claim 1, wherein
   the controller is configured to control the switching device so that the converter operates in a discontinuous mode.

4. The power supply device of claim 1, wherein
   the reverse flow preventer includes a diode electrically connected in series with the primary winding and the switching device between opposite ends of the capacitor so as to allow the discharging current from the capacitor to flow through the reverse flow preventer.

5. A lighting fixture comprising:
   a light source unit; and
   the power supply device of claim 1 for operating the light source unit.

6. A power supply device serving as a DC power supply, comprising:
   a converter including a pair of input terminals, a pair of output terminals, a transformer including a primary winding and a secondary winding which are magnetically coupled, a capacitor, and a switching device; and
   a controller configured to control the switching device,
   the capacitor being electrically connected between the pair of input terminals,
   the capacitor, the primary winding, and the switching device being connected in series in a closed circuit,
   the converter being configured to, when the switching device is switched to an on-state, store energy inputted through the pair of input terminals in the primary winding and the secondary winding, and, when the switching device is switched to an off-state, produce a DC output voltage between the pair of output terminals by use of energy stored in the primary winding and the secondary winding,
   the converter further including a reverse flow preventer for preventing, when the switching device is switched to the off-state, a current from flowing through the closed circuit in an opposite direction to a direction of a discharging current from the capacitor, and
   the converter further including a coupling capacitor connected between the primary winding and the secondary winding,
   the coupling capacitor having:
      a primary terminal electrically connected to a first end of the primary winding; and
      a secondary terminal electrically connected to a first end of the secondary winding,
   the primary winding having a second end electrically connected to a first terminal of the capacitor, and
   the secondary winding having a second end electrically connected to one of the pair of output terminals.

7. The power supply device of claim 6, wherein
   a turn ratio of the transformer defined as a value calculated by dividing a number of turns of the secondary winding by a number of turns of the primary winding is equal to or larger than 1.

8. The power supply device of claim 6, wherein
   the controller is configured to control the switching device so that the converter operates in a discontinuous mode.

9. The power supply device of claim 6, wherein
the reverse flow preventer includes a diode electrically connected in series with the primary winding and the switching device between opposite ends of the capacitor so as to allow the discharging current from the capacitor to flow through the reverse flow preventer.

10. A lighting fixture comprising:
a light source unit; and
the power supply device of claim 6 for operating the light source unit.

11. A power supply device serving as a DC power supply, comprising:
a converter including a pair of input terminals, a pair of output terminals, a transformer including a primary winding and a secondary winding which are magnetically coupled, a capacitor, and a switching device; and
a controller configured to control the switching device,
the capacitor being electrically connected between the pair of input terminals,
the capacitor, the primary winding, and the switching device being connected in series in a closed circuit,
the converter being configured to, when the switching device is switched to an on-state, store energy inputted through the pair of input terminals in the primary winding and the secondary winding, and, when the switching device is switched to an off-state, produce a DC output voltage between the pair of output terminals by use of energy stored in the primary winding and the secondary winding,
the converter further including a reverse flow preventer for preventing, when the switching device is switched to the off-state, a current from flowing through the closed circuit in an opposite direction to a direction of a discharging current from the capacitor, and
the converter further including a coupling capacitor connected between the primary winding and the secondary winding,
the switching device being inserted between a primary terminal of the coupling capacitor and a first terminal of the capacitor,
the primary winding having:
a first end electrically connected to a connection point between the switching device and the primary terminal of the coupling capacitor;
a second end electrically connected to a second terminal of the capacitor,
the coupling capacitor having a secondary terminal electrically connected to a first end of the secondary winding, and
the secondary winding having a second end electrically connected to one of the pair of output terminals.

12. The power supply device of claim 11, wherein
a turn ratio of the transformer defined as a value calculated by dividing a number of turns of the secondary winding by a number of turns of the primary winding is equal to or larger than 1.

13. The power supply device of claim 11, wherein
the controller is configured to control the switching device so that the converter operates in a discontinuous mode.

14. The power supply device of claim 11, wherein
the reverse flow preventer includes a diode electrically connected in series with the primary winding and the switching device between opposite ends of the capacitor so as to allow the discharging current from the capacitor to flow through the reverse flow preventer.

15. A lighting fixture comprising:
a light source unit; and
the power supply device of claim 11 for operating the light source unit.

* * * * *